Feb. 14, 1939. E. L. POTTS 2,147,544
ORIENTING SUB
Filed Sept. 29, 1938
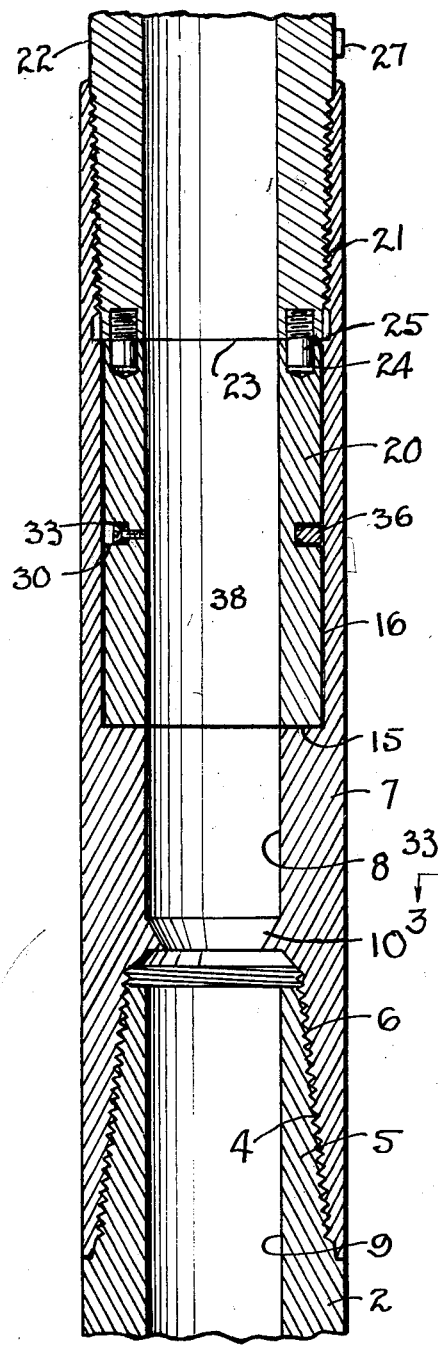
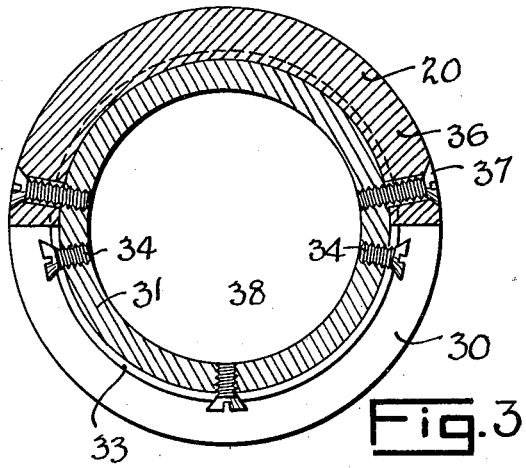
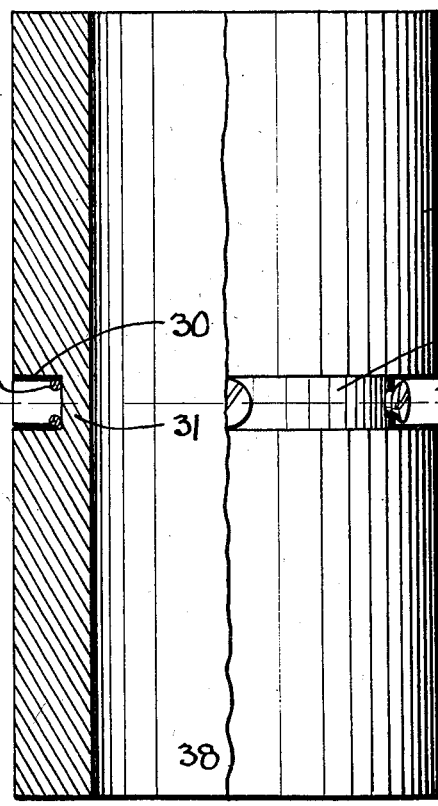
Fig. 1.
Fig. 2.
Fig. 3.
Inventor
ERNEST L. POTTS.
By Jesse R. Stone
Lester B. Clark
Attorneys.

Patented Feb. 14, 1939

2,147,544

UNITED STATES PATENT OFFICE 2,147,544

ORIENTING SUB

Ernest L. Potts, Houston, Tex., assignor to Sharp Deflecting Tool Company, Houston, Tex., a corporation Application September 29, 1938, Serial No. 232,291

7 Claims. (Cl. 255—28)

The invention relates to an improvement in drill stem connections where the drill stem is to be used in combination with a surveying or orienting tool which operates in a magnetic field.

The invention relates generally to the type of method and apparatus disclosed in the patent to Hyer, No. 2,120,670, granted June 14, 1938, but constitutes an improvement in the drill stem connection whereby a non-magnetic section may be removably positioned in the drill stem in an oriented position and the cost of construction materially reduced.

Another object of the invention is to provide a magnetic sleeve to be disposed inside of the drill stem so as to create a magnetic field within the drill stem to receive a magnet.

Another object of the invention is to provide a non-magnetic sleeve which is positioned in a drill stem in a predetermined relationship thereto so that a magnetic compass lowered into this non-magnetic section will operate accurately so that recordings can be made and removed to the surface to give an accurate indication of the orientation of the drill stem.

Another object of the invention is to provide a semi-circular magnet to set up a magnetic field inside of a drill stem.

Other and further objects of the invention will be readily apparent when the following description is considered in connection with the accompanying drawing wherein:

Fig. 1 is a broken detail vertical sectional view illustrating the arrangement of the parts.

Fig. 2 is a side elevation of the non-magnetic sleeve and showing the arrangement of the magnet affixed thereto.

Fig. 3 is a section taken on the line 3—3 of Fig. 2.

In the Hyer patent above referred to, a string of drill pipe is lowered into the well bore and is to be oriented in a predetermined position for any desired purpose, such as facing a whipstock in the desired direction. A magnet is carried by the drill stem and the orientation of this magnet with respect to the face of the whipstock is, of course, known at the time the whipstock and the drill stem are connected together at the surface. After the drill stem has been lowered into the well bore a surveying instrument is then passed through the drill stem to the elevation of the magnet and a magnetic compass in the surveying instrument is attracted by the magnet and a recording made of the azimuth of the magnet in the well bore. If the whipstock is then not facing in the desired direction the entire assembly may be turned a portion of a revolution so as to face the whipstock or other instrument in the desired direction.

The present invention contemplates a specific improvement in the arrangement of the non-magnetic sleeve so that it may be readily removed when the drill stem is to be used without a surveying instrument and to simplify the construction and operation of the equipment. In Fig. 1 a section of drill pipe or drill collar 2 is connected to any suitable instrument or tool which is to be lowered into the well bore and whose position it is desired to accurately determine. Some tools of this sort are whipstocks, deflecting tools, surveying instruments, spudding bits, etc.

The upper end of the drill collar 2 is externally threaded at 4 to provide a pin member 5 which is received within the box member 6 of a drill sub 7.

The sub 7 is of special construction and has the usual water course or passage 8 therethrough, which is preferably of the same diameter as the passage 9 in the drill collar. At the lower end of the passage 8 a shoulder 10 is provided which forms a seat for the surveying instrument so that it will be retained at a specific elevation so that the magnetic compass in the surveying instrument will be at the elevation of the magnet in the drill stem.

At the top of the passage 8 the sub 7 has been enlarged to provide a shoulder 15 and an enlarged cylindrical recess 16. This recess and shoulder are arranged to receive a sleeve 20, which is of non-magnetic material. This sleeve is of such a length that it extends up to the bottom of the threaded area 21 on the inside of the upper end of the sub 7. A piece of drill pipe 22 is shown as threaded into the area 21 and extending downwardly close to the upper end 23 of the sleeve 20. A plurality of recesses 24 in the upper end of the sleeve are arranged to receive the pins 25 which are carried by the lower end of the drill pipe 22. The sleeve and the drill pipe will be assembled together and screwed into position so that there can be no relative rotational movement between the drill pipe 22 and the sleeve 20. The pins 25 and the recess 24 are so arranged relative to each other that there will be a definite relationship between the magnet on the sleeve 20 and an indicator lug or marker 27 on the periphery of the pipe 22. In this manner, after the parts have been assembled the marker 27 will indicate to the operator the definite position in which the magnet is positioned inside of the sub 7.

The sleeve 20 is best seen in Figs. 2 and 3 and comprises a cylindrical body of non-magnetic material which has an annular recess or groove 30 provided in its outer periphery. This groove provides a neck portion 31 which joins the upper and lower parts of the body together.

As seen in Fig. 3 this groove serves to carry and protect a magnet 33. This magnet is in the form of a semi-circle which is affixed to the next portion 31 by means of a plurality of screws 34. The other half of the groove 30 is filled with a semi-circular block 36, which is held in position by the screws 37. It seems obvious that in view of the fact that the entire sleeve is of non-magnetic material that the presence of the magnet 33 will set up a magnetic field in the interior 38 of the sleeve 30.

The arrangement of this non-magnetic sleeve permits the magnetic field, due to the magnet 33, to build up inside of the drill stem and much more satisfactory results have been obtained than is possible with an arrangement such as shown in the Hyer patent where the magnet is exposed and where an enormous amount of non-magnetic material is required in order to protect the magnet and to obtain an accurate reading.

In operation it is only necessary to know the relationship between the marker 27 and the magnet 33 and this is accomplished by means of the pins 25 so that once the sub 7 and the drill pipe 22 are assembled this relationship is known. Then, when the tool or instrument is connected to the lower end of the drill collar 2 the face or direction in which the tool is to be oriented is known with respect to the marker 27, so that with this information at hand the string of drill pipe is lowered into the well bore and when the reading of the surveying instrument is brought to the surface the position of the tool is known as soon as the position of the magnet is ascertained from the surveying instrument. It is only necessary then to rotate the drill stem thru the desired angle to bring the face of the tool to the desired position.

What is claimed is:—

1. The combination of a drill stem, a drill sub connected thereto, a drill collar connected to said sub, a recess in said sub, a non-magnetic sleeve disposed in said recess, a permanent magnet carried by said sub, and means on said pipe and sleeve to indicate after assembly the position of said magnet in said sub.

2. The combination of a drill stem, a drill sub connected thereto, a drill collar connected to said sub, a recess in said sub, a non-magnetic sleeve disposed in said recess, a permanent magnet carried by said sub, and means on said pipe and sleeve to indicate after assembly the position of said magnet in said sub, said magnet being semi-circular to build up a magnetic field inside of the drill pipe.

3. The combination of a drill stem, a drill sub connected thereto, a drill collar connected to said sub, a recess in said sub, a non-magnetic sleeve disposed in said recess, a permanent magnet carried by said sub, and means on said pipe and sleeve to indicate after assembly the position of said magnet in said sub, said means including interfitting members on said sleeve and drill pipe and a marker exposed on the outside of said pipe.

4. A non-magnetic sleeve for use in well orienting operations comprising a cylindrical body of non-magnetic material, and a semi-circular permanent magnet fixed to said body to set up a magnetic field within the body.

5. A sleeve of the character described including a hollow body of non-magnetic material, an annular groove therearound, a permanent magnet fixed in a part of said groove to set up a magnetic field in the hollow portion of said sleeve.

6. A sleeve of the character described including a hollow body of non-magnetic material, an annular groove therearound, a permanent magnet fixed in a part of said groove to set up a magnetic field in the hollow portion of said sleeve, said magnet being semi-circular so that the poles thereof will attract the poles of a magnetic compass passed into the magnetic field within the sleeve.

7. A sub for drill pipe including means to connect the sub in a string of pipe, a chamber in the sub, a shoulder at the base of said chamber, a sleeve of non-magnetic material in said chamber on said shoulder, a magnet carried by said sleeve to set up a magnetic field within the drill sub.

ERNEST L. POTTS.